US012356077B2

(12) United States Patent
Stigwall et al.

(10) Patent No.: US 12,356,077 B2
(45) Date of Patent: Jul. 8, 2025

(54) MEASURING SYSTEM WITH PANORAMIC IMAGE ACQUISITION FUNCTIONALITY

(71) Applicant: HEXAGON TECHNOLOGY CENTER GMBH, Heerbrugg (CH)

(72) Inventors: Johan Stigwall, St. Gallen (CH); Andreas Schwendener, Chur (CH); Thomas Jensen, Rorschach (CH); Marco Schröder, Neukirch (CH); Zheng Yang, Friedrichshafen (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 333 days.

(21) Appl. No.: 17/706,349

(22) Filed: Mar. 28, 2022

(65) Prior Publication Data

US 2022/0321779 A1 Oct. 6, 2022

(51) Int. Cl.
*H04N 23/698* (2023.01)
*G01C 11/02* (2006.01)
*H04N 23/695* (2023.01)

(52) U.S. Cl.
CPC ......... *H04N 23/698* (2023.01); *G01C 11/025* (2013.01); *H04N 23/695* (2023.01)

(58) Field of Classification Search
CPC .. H04N 23/698; H04N 23/695; G01C 11/025; G03B 17/561; G06V 10/143; G06V 10/145
See application file for complete search history.

(56) References Cited

U.S. PATENT DOCUMENTS

| 5,650,813 A * | 7/1997 | Gilblom .................. H04N 23/58 348/E7.087 |
| 10,477,104 B1 * | 11/2019 | Roessler ................ H04N 23/63 |
| 11,614,457 B2 | 3/2023 | Sommerer et al. |

(Continued)

FOREIGN PATENT DOCUMENTS

| CN | 101074965 A | 11/2007 |
| CN | 101630066 A | 1/2010 |

(Continued)

OTHER PUBLICATIONS

European Search Report dated Oct. 12, 2021 as received in Application No. 21166123.6.

(Continued)

*Primary Examiner* — Kathleen V Nguyen
(74) *Attorney, Agent, or Firm* — Maschoff Brennan (57) ABSTRACT

A measuring system for acquiring three-dimensional measuring points, comprising a base unit, a support unit mounted on the base unit and rotatable relative to the base unit around an azimuth axis, an emitting unit, a receiving unit, a directing unit mounted in the support unit, and configured for directing a transmission beam from the emitting unit towards a scene, directing a reception beam from the scene to the receiving unit, a first actuator configured for rotating the support unit relative to the base unit around the azimuth axis, a second actuator configured for rotating the directing unit relative to the support unit around the elevation axis, a first angle encoder configured for measuring a rotatory position of the support unit, a second angle encoder configured for measuring a rotatory position of the directing unit, a camera comprising an image sensor.

19 Claims, 4 Drawing Sheets

(56) References Cited

U.S. PATENT DOCUMENTS

| | | | | |
|---|---|---|---|---|
| 2006/0156254 | A1* | 7/2006 | Satake | G09G 5/00 |
| | | | | 715/838 |
| 2007/0237423 | A1* | 10/2007 | Tico | H04N 23/951 |
| | | | | 382/284 |
| 2009/0021576 | A1* | 1/2009 | Linder | H04N 23/631 |
| | | | | 348/222.1 |
| 2010/0289922 | A1* | 11/2010 | Brenner | H04N 23/698 |
| | | | | 348/E9.002 |
| 2011/0181687 | A1* | 7/2011 | Yoshizumi | H04N 23/698 |
| | | | | 348/36 |
| 2011/0249091 | A1 | 10/2011 | Kishimoto | |
| 2012/0249728 | A1* | 10/2012 | Kato | H04N 23/698 |
| | | | | 348/E5.037 |
| 2017/0363421 | A1* | 12/2017 | Kumagai | G01C 3/08 |
| 2018/0308227 | A1* | 10/2018 | Chen | G06T 5/50 |
| 2019/0208111 | A1* | 7/2019 | Wendel | H04N 23/745 |
| 2019/0234941 | A1* | 8/2019 | Abeytunge | G01N 33/5091 |
| 2020/0231176 | A1* | 7/2020 | Motoyama | G01S 7/4972 |
| 2022/0187122 | A1* | 6/2022 | Tan | G01J 1/44 |

FOREIGN PATENT DOCUMENTS

| | | |
|---|---|---|
| CN | 101750868 A | 6/2010 |
| CN | 102413348 A | 4/2012 |
| CN | 105357433 A | 2/2016 |
| CN | 105719235 A | 6/2016 |
| EP | 3 772 723 A1 | 2/2021 |
| JP | 2020-012750 A | 1/2020 |

OTHER PUBLICATIONS

CN Notice of Allowance Dated Aug. 18, 2023 as received in Application No. 202210275425.8.

* cited by examiner

MEASURING SYSTEM WITH PANORAMIC IMAGE ACQUISITION FUNCTIONALITY

FIELD OF THE INVENTION

The present invention relates to a measuring system for acquiring three-dimensional measuring points, in particular a geodetic measuring instrument. Examples of such instruments are total stations, theodolites, or laser scanners.

BACKGROUND

Generic measuring systems often comprise a camera for documentation reasons, for a point cloud colorization, for target searches, for target distance locating, and/or for target identification. In this way, the measured points or point cloud data are enhanced with further information particularly helpful for their eventual usage, or targets available in the scene can automatically detected and aimed at, in particular under consideration of tracking/measuring parameters belonging to a specific type of target.

For measuring three-dimensional points, the instruments usually comprise means for rotating around a vertical axis. The conditions are therefore excellent for not only capturing single images, but for capturing panoramic images making use of the precise rotatory motion.

A common mode of operation when capturing panoramic images with a measuring system is a "stop-and-go" approach where full field-of-view images are taken at regular intervals having some overlap. As the name implies, the motion is stopped for each image, and thus there are no hard limitations on exposure time. Consequently, stop-and-go is suitable for low-light situations and by shooting an HDR-burst of multiple images having different exposure times it is possible to cover a large dynamic range. Since there is no motion during acquisition, synchronization is also trivial and the software running on the instrument can control the image triggering.

The downside of stop-and-go panoramas is that the stitching in the overlapping region is non-trivial. Unless the camera is rotated around its entrance pupil, there will be a "parallax" shift, which results in double-exposure-like ghosting. The stitching parallax also results in an uncertainty regarding the projection mapping, so it is also difficult to accurately render 3D points onto the panorama or use the panorama for measurements.

Another problem for the mechanics are the acceleration forces. A relatively large mass has to be accelerated and deaccelerated for each position causing vibrations and require a settling time.

Furthermore, there can be "ghosting" when objects are in motion (i.e. multiple copies of the same person or semi-transparent partial objects in the overlap region), and any non-uniformity in image brightness, color, sharpness may create a visible tile-pattern in the panorama. The motion artefacts are further aggravated when multi-exposure HDR burst are captured and may yield not only "ghosts" but also strange color/intensity fringes around edges of moving objects since the HDR-burst data is not consistent. Even small motions such as wind blowing in trees may yield serious artefacts.

Available measuring systems also have cameras for image capturing and target search systems separated in two independent units causing a higher constructional expense and complexity. Further to that, these units are spatially offset relative to one another so that they do not share the same geometrical reference system.

Therefore, the present disclosure provides an improved measuring system. A measuring system allows for a more robust, more accurate, and faster panoramic image acquisition for surveying purposes with lower wear of measuring system components.

SUMMARY

The disclosure relates to measuring system for acquiring three-dimensional measuring points, comprising a base unit, a support unit mounted on the base unit and rotatable relative to the base unit around an azimuth axis, an emitting unit configured for providing a transmission beam, a receiving unit configured for detecting a reception beam, a directing unit mounted in the support unit, rotatable relative to the support unit around an elevation axis, and configured for directing the transmission beam from the emitting unit towards a scene, directing the reception beam from the scene to the receiving unit, a first actuator configured for rotating the support unit relative to the base unit around the azimuth axis, a second actuator configured for rotating the directing unit relative to the support unit around the elevation axis, a first angle encoder configured for measuring a rotatory position of the support unit, a second angle encoder configured for measuring a rotatory position of the directing unit, a camera comprising an image sensor, wherein the camera is configured for capturing an image of at least part of the scene, a computer connected to the first actuator, the second actuator, the first angle encoder, the second angle encoder, and the camera, wherein the computer is configured for controlling a rotatory speed of the support unit via the first actuator, and controlling a rotatory speed of the directing unit via the second actuator, wherein, for generating a first panoramic image with the camera, the computer is configured for: controlling the image sensor to sample frames with a frame rate, controlling the first actuator to rotate the support unit with a rotatory speed that is adapted to the frame rate of the image sensor in such a way that n consecutive frames are overlapping, wherein n≥3, and processing at least some of the sampled frames to form the first panoramic image. In particular, the rotatory speed is adapted to the frame rate in such a way that between 3 and 20 consecutive frames are overlapping. In other words, a certain amount of consecutive frames overlapping means that these certain amount of consecutive frames are sharing an overlapping region.

In some embodiments, controlling the image sensor to sample frames comprises controlling the image sensor to sample frames with an image aspect ratio of between 1:5 and 1:40.

In some embodiments, the computer is configured for colorizing a point cloud with the first panoramic image, wherein the point cloud comprises three-dimensional measuring points acquired with the measuring system from a same setup location the first panoramic image is captured from.

In some embodiments, the measuring system comprises a display unit configured for displaying the first panoramic image on a graphical user interface (GUI) and augmenting the first panoramic image on the GUI with an indicator, the indicator in particular representing the current field of view of the camera or the current pointing direction of the camera.

In some embodiments, processing the sampled frames comprises stitching and averaging the overlapping consecutive frames.

In some embodiments, processing the sampled frames is based on respective rotatory positions of the support unit measured by the first angle encoder at each point in time a frame is sampled, in particular also based on respective rotatory positions of the directing unit measured by the second angle encoder at each point in time a frame is sampled.

In some embodiments, for generating the first panoramic image with the camera, the computer is further configured for controlling the image sensor to sample the frames with an alternating exposure time.

In some embodiments, the computer is configured for comparing the overlapping parts of the overlapping consecutive frames with each other and discarding abnormal overlapping parts when processing the sampled frames to form the first panoramic image.

In some embodiments, controlling the image sensor to sample frames comprises controlling the image sensor to sample frames in full resolution to obtain raw image files, in particular wherein processing the sampled frames comprises digitally demosaicing the raw image files.

In some embodiments, processing the sampled frames comprises binning pixels of each sampled frame, or wherein controlling the sensor to sample frames comprises controlling the sensor to sample frames with pixel binning.

In some embodiments, the computer is configured for adapting an exposure time of the sensor and the rotatory speed of the support unit based on an exposure time as detected necessary by the camera due to respective light conditions detected by the camera at the corresponding rotatory position of the support unit.

In some embodiments, the measuring system comprises a flicker sensor configured for detecting power-line flicker caused by a lamp illuminating the scene, wherein the computer is configured for adapting, based on the detected power-line flicker, at least one of the frame rate and the amount of overlapping consecutive frames n.

In some embodiments, wherein the computer is configured for generating a second panoramic image covering the same part of the scene as the first panoramic image, detecting moving obstacles in the first and second panoramic images based on an analysis of object contours, and, in case a moving obstacle is detected in at least one of the first and second panoramic images, generating an obstacle-freed panoramic image by processing the first and second panoramic image such that the obstacle-freed panoramic image is at least in part freed from the detected moving obstacle.

In some embodiments, the computer is configured for generating a third panoramic image covering in part the same part of the scene as the first panoramic image, wherein the third panoramic image is captured with a rotatory position of the directing unit different from the rotatory position of the directing unit which the first panoramic image was captured with, and stitching the first and third panoramic images.

In some embodiments, for generating a preparatory panoramic image with the camera, the computer is configured for: controlling the image sensor to sample preparatory frames with a preparatory frame rate, controlling the first actuator to rotate the support unit, and processing the sampled preparatory frames to form the preparatory panoramic image, and wherein the computer is further configured for using the preparatory panoramic image to derive an exposure time or a plurality of different exposure times for corresponding rotatory positions of the support unit, and using the derived exposure time or the derived different exposure times for generating the first panoramic image.

In some embodiments, the measuring system comprises a visual-spectrum (VIS) flash unit configured for emitting VIS flash light towards the scene and connected to the computer.

In some embodiments, the measuring system comprises an infrared (IR) flash unit configured for emitting IR flash light towards the scene and connected to the computer.

In some embodiments, the camera further comprises an IR sensor or the image sensor is embodied as an IR sensor, said IR sensor configured for capturing an IR image based at least in part on detected reflections of the IR flash light. In particular, in case the camera comprises the IR sensor in addition to the image sensor, for generating an IR panoramic image, the computer is configured for controlling the IR sensor in the same manner as the image sensor is for generating the first panoramic image.

In some embodiments, the camera further comprises a Time-Of-Flight (TOF) sensor or the image sensor is embodied as a Time-Of-Flight (TOF) sensor, said TOF sensor configured for capturing a TOF image, said TOF image comprising range data and image data, wherein the image data are either generated by the detection of visual-spectrum (VIS) light or IR light. Image data are in particular visual intensity data.

In some embodiments, for identifying a target which is located in the scene and emitting a modulated light pattern, the computer is configured for detecting the modulated light pattern based on the overlapping frames and relative times of capture of these overlapping frames.

In some embodiments, processing at least some of the sampled frames to form the first panoramic image is embodied as, for n=3, processing every second of the sampled frames to form the first panoramic image, or, for n>3, processing at least every m-th of the sampled frames to form the first panoramic image, wherein m=(n−1).

In some embodiments, the measuring system comprises a flash unit configured for emitting a flash light towards the scene, the computer connected to the flash unit, the camera configured for detecting a reflection of the flash light, wherein, for generating a target location panoramic image with the camera, the computer is configured for, for n=3, processing every respective other second of the sampled frames to form a fourth panoramic image, or, for n>3, processing at least every r-th of the sampled frames to form a fourth panoramic image, wherein r=(n−1) and wherein the at least every r-th of the sampled frames are other than the at least every m-th of the sampled frames, controlling the flash to emit the flash light with a flash rate that is adapted so that every of the sampled frames that are processed to form the fourth panoramic image captures reflections of the flash light, generating a difference image from the first and fourth panoramic image, wherein the target location panoramic image is based on the difference image.

In some embodiments, the flash light is IR flash light, wherein the image sensor comprises either a filter that is switchable between VIS and IR, a divided filter, or a plurality of pixels sensitive for the VIS and a plurality of pixels sensitive for the IR spectrum.

In some embodiments, the camera comprises, or the image sensor is embodied as, a dynamic vision sensor (DVS) which is also known as event camera sensor. Such a DVS sensor may be configured to detect in real time changes in the image, which may support the search of reflective targets.

BRIEF DESCRIPTION OF THE DRAWINGS

By way of example only, preferred embodiments will be described more fully hereinafter with reference to the accompanying figures, wherein.

DETAILED DESCRIPTION

Figure 1:
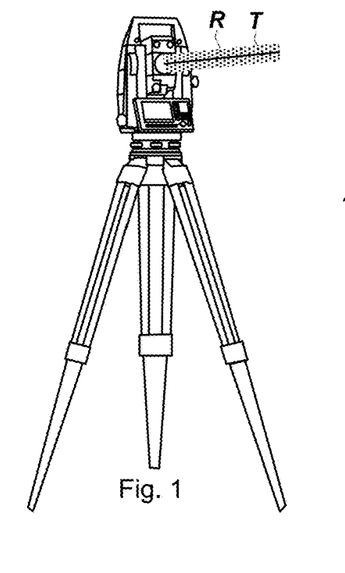
FIG. 1 shows an exemplary measuring system comprising a total station.

FIG. 1 shows a total station 1 comprised by an exemplary measuring system for acquiring three-dimensional measuring points. An abstracted illustration of the main components is provided in FIG. 2. The total station 1 comprises a base unit 2, a support unit 3 mounted on the base unit 2 and rotatable relative to the base unit 2 around an azimuth axis A, an emitting unit 4 configured for providing a transmission beam T, a receiving unit 5 configured for detecting a reception beam R, a directing unit 6 mounted in the support unit 3, rotatable relative to the support unit 3 around an elevation axis E, and configured for directing the transmission beam T from the emitting unit 4 towards a scene, directing the reception beam R from the scene to the receiving unit 5. The directing in this example of a total station is done by projection optics in a telescope. In other examples, e.g. a laser scanner, the directing unit may be a high-speed rotating mirror, wherein the emitting unit and the receiving unit are arranged in the support unit and the mirror deflects the transmission beam and reception beam to/from the scene. The emitting unit and the receiving unit are to be understood as part of an electronic distance meter (EDM) or also known as range finder using time of flight, multiple frequency phase-shift, or interferometry technology. That is, for example, the emitting unit is a light source, in particular a laser diode, and the receiving unit comprises a sensor configured to detect the reflections of the light that the emitting unit is transmitting.

Figure 2:
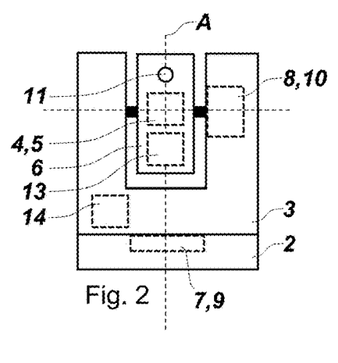
FIG. 2 shows the total station from FIG. 1 in a schematic view.

A first actuator 7 is provided for rotating the support unit 3 relative to the base unit 2 around the azimuth axis A, and a second actuator 8 is provided for rotating the directing unit 6 relative to the support unit 3 around the elevation axis E. A first angle encoder 9 is provided for measuring a rotatory position of the support unit 3 relative to the base unit 2 around the azimuth axis A, and a second angle encoder 10 is provided for measuring a rotatory position of the directing unit 6 relative to the support unit 3 around the elevation axis E.

A camera 11, arranged here in the directing unit 6, comprises an image sensor 12 (see FIG. 3), wherein the camera 11 is configured for capturing an image of at least part of the scene. The camera 11 is here located in the directing unit 6, but in other embodiments, the camera 11 may as well be located in the support unit or the base unit. It may further stand out of (externally attached to) these components so as to not form an integrated part of the components. Several embodiments are presented with FIGS. 4-8 further below.

A computer may be a single component of the measuring system, or it may itself comprise several physically distributed units. In the shown example, the computer comprises a field programmable gate array (FPGA) 13 and a central processing unit (CPU) 14. In other embodiments, the computer comprises a network connector and a remote server configured for performing at least some of the data processing. The computer is connected to the first angle encoder 9, the second angle encoder 10, the camera 11, the first actuator 7, and the second actuator 8.

Figure 3:
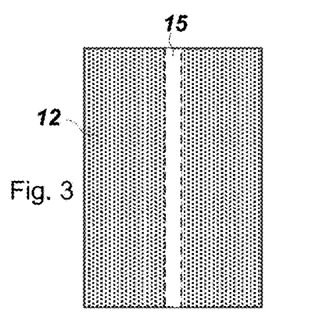
FIG. 3 shows an exemplary sensor used for the panoramic image acquisition.
Figure 5:
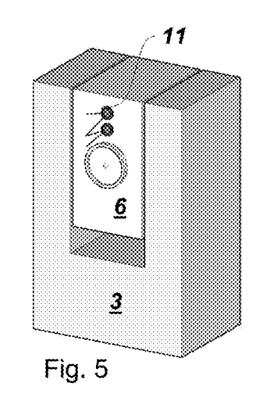
Figure 6:
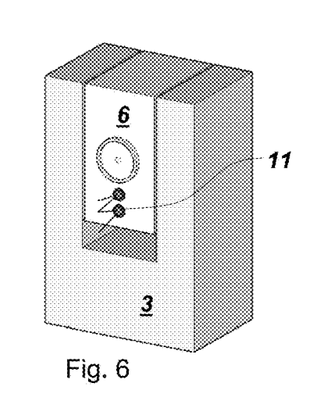
Figure 7:
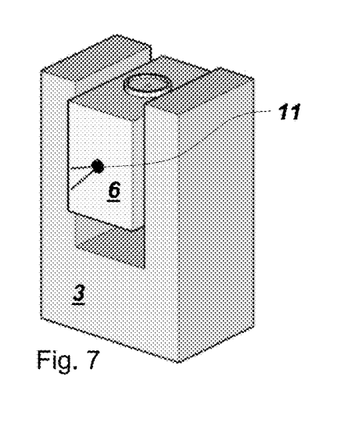
Figure 8:
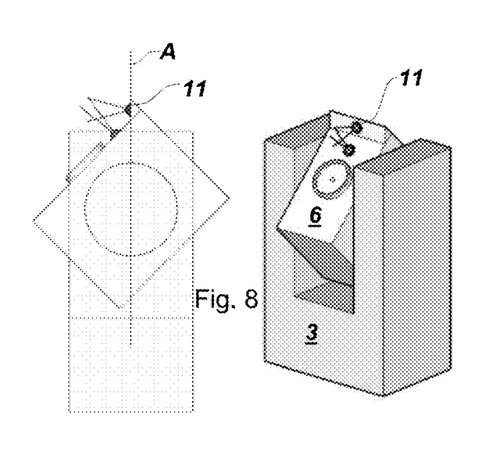

As shown in FIG. 3, the sensor may be a "regular" rectangular image sensor. In this embodiment, the sensor is sensitive to the visual spectrum (VIS). The sensor might for example have a sensor aspect-ratio of 3:2 or 4:3. The pixels actually used for shooting panoramic images, however, may be limited to a stripe 15 with a long extent being aligned parallel to the azimuth axis A and with a shorter extent being aligned parallel to the elevation axis E. The camera 11 is particularly built into the directing unit 6 such that the sensor is arranged in portrait mode considered from a direction parallel to the beam T. In other embodiments, the sensor may be formed only by the used pixel array 15. However, one advantage of having the full sized sensor 12 at hand is of course that full-FOV single shots with the "regular" aspect-ratio can be taken when not in a "panoramic mode". In case such a larger sensor is built in, using only a part of it for the panoramic image acquisition, this used part of the sensor can be anywhere within the sensor (left, middle, right; surrounded by, or extending till the edges). Another advantage of using such a "regular" high-resolution sensor is that an extra overview camera that would normally have been provided (FIGS. 5, 6, and 8 show examples having two distinct cameras) can now be omitted because even a section of the high-resolution sensor, in particular a center part of it, could be used for capturing overview images while still having a sufficiently high resolution. A further advantage is that with such a sensor one can achieve an enhanced dynamic range in the images by making use of pixel binning, which is feasible if the resolution is e.g. 20 Megapixels.

The camera 11 with the depicted image sensor 12 may favorably have a field of view (FOV) 19 (see FIG. 10) of roughly 40°×27°. For example, the sensor 12 has a resolution of 5544×3694 pixels and a size of 13.3×8.9 mm. The sector 15 of the sensor 12 which covers the scene 16 may have a horizontal field of view of between 1 and 10 degrees. Of course this is just one embodiment, and other sizes, resolutions, and FOVs are possible without limiting the benefits of the present disclosure.

The image sensor may be a visual-spectrum (VIS) sensor, a Time-Of-Flight (TOF) sensor, or an infrared (IR) sensor. The camera may however have more than only one image sensor, wherein these more than one image sensors can again be chosen from the VIS, TOF, IR sensor in a desired combination. If the camera has more than one image sensor, these sensors may be positioned with an offset within the camera while having their own optics and optical paths. They may however also share the optics and at least a part of the optical path while being provided with light from the shared optical path via a beam-splitter or a similar optical element. There may also be more than one camera provided in the measuring system, wherein the more than one camera(s) may have an image sensor chosen from a VIS, TOF, IR sensor and preferably different than the image sensor type of the first camera.

Figure 4:
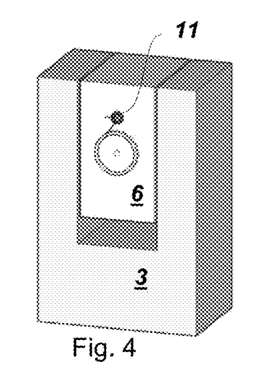
FIGS. 4-8 show embodiments of measuring systems which generally differ in the position of the camera.

FIGS. 4-8 show some embodiments of the camera 11 placement. FIG. 4 shows the camera arranged above the telescope optics of the total station. FIG. 5 shows the camera above the telescope optics, but as well above a further camera that is used for other purposes, e.g. overviewing the scene.

FIG. 6 shows a similar arrangement but located below the telescope optics. The camera can also be arranged on the bottom side of the directing unit, see FIG. 7, which is advantageous because the center of the acquired images is on-axis with the points measured with the EDM. FIG. 8 shows an embodiment of the total station having an angled protrusion in the directing unit bearing the camera and aligning it oblique to a measuring beam axis (non-parallel to the beam T). As is shown with the sketch on the left side of FIG. 8, for obtaining the panoramic image, the directing unit would turn around the axis E such that the camera frontally faces the surrounding scene. Further, it can be seen that the camera projection center is aligned with the azimuth axis A that the camera rotates around during the panorama mode resulting in a reduction of stitching parallax.

Of course, further embodiments may provide an arrangement of the camera or more than one camera in the support unit 3 instead of or additionally to the camera arrangement in the directing unit 6.

For capturing a panoramic image with the camera 11, the computer is configured for controlling the sensor 12 to sample frames with a certain frame rate and in particular with an image aspect ratio of between 1:5 and 1:20, preferably around 1:10. Again, this might be only a sector 15 from a bigger sensor, or the sensor might be dimensioned with this form factor.

Figure 9:
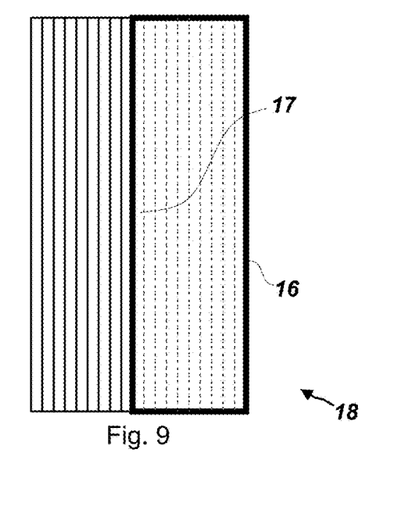
FIG. 9 shows a schematic view of a swath of the sensor sampling 10 frames having overlapping stripe regions.
Figure 10:
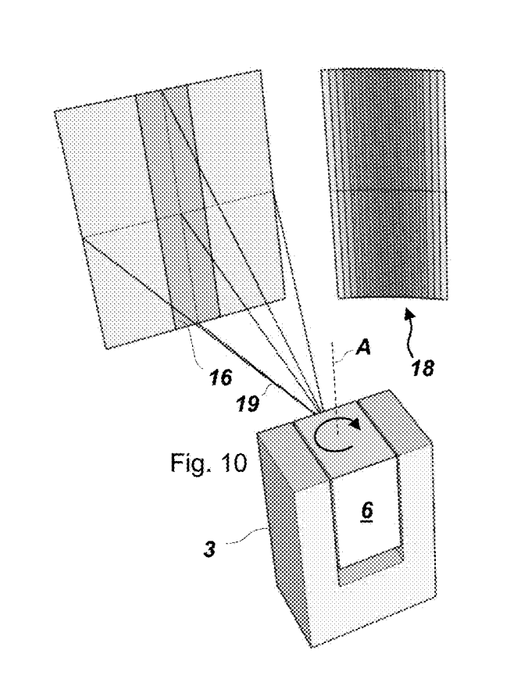
FIG. 10 shows a schematic, perspective view of a measuring system and the field of view of the camera, and next to it the overlapping frames it samples.

Sticking to the shown example, while the section 15 of the sensor 12 is sampling with the frame rate, the computer controls the first actuator 7, in particular with feedback from the first angle encoder 9, to rotate the support unit 3 with a speed that is adapted to the frame rate in such a way that at least three consecutive frames share an overlap. Compared to panoramic modes known in the art (stop-and-go), a continuous rotation is much smoother and prevents early wear of the components due to acceleration and deceleration. Also, the data acquisition is much faster because the components do not have to be accelerated and decelerated. FIG. 9 shows ten overlapping frames 18, the latest frame 16 of which being illustrated with bold lines and the dashed lines indicating the extents of the former frames. Each of those ten frames overlaps with the nine other stripes by a similar, in particular same, step-size or interval. The first interval 17 on the left inside the bold rectangular shows the region where all images in this ten-image sequence (which is of course just a small part of a longer sequence) overlap. FIG. 10 shows all these things in a perspective view and less abstracted way.

The computer is configured for processing at least some of the sampled frames to form the first panoramic image. The process can be described as a panorama image "accumulation" that progresses with the rotation of the support unit 3 around the azimuth axis. In particular, once each of the intervals is sampled ten times (in other embodiments, this amount may differ depending on the overlap of consecutive frames), the stripes can be averaged and blended. This will result in, among others, an advanced exposure/brightness, sharpness, and resolution.

To put it in different words, in some embodiments, the stripes are mapped onto the panorama image by taking the encoder readings and the camera's intrinsic and extrinsic calibration into account. The corresponding panorama pixels are accumulated with the pixel values of each stripe. Depending on the motion speed, lens distortion etc., the number of samples per panorama pixel may differ slightly, so the panorama (=panoramic image) could further be normalized by dividing by the number of samples accumulated in each pixel. To further reduce the visibility of "seams" at the edge of each stripe, the pixels may be further "blended" or "weighted" so that the weights are gradually reduced towards the edges of the stripes.

Thanks to the narrow stripe width, which in turn gives a small stitching parallax, the averaging over the (in this example) ten overlapping stripes does not cause a large blur and the noise is reduced by the averaging process so that the resulting panorama has excellent sharpness and dynamic range. Also, due to the fact in some embodiments that only part of the sensor is used for high-precision applications (i.e. the narrow stripe 15, and in some cases also a part of the sensor used for overview images), the optics used in the camera may have reduced requirements with regard to sharpness. Specifically, the lens(es) may be produced only with high accuracy where it is needed for the projection. The image quality for example in the fringe regions of the sensor does not have the highest priority so that significant costs could be saved in the optics production. To put it differently, the lens may be provided with an overall satisfying quality but only have a particularly precise quality in the central crop region, e.g. in order to allow digital zooming in this region due to the higher image quality. Also, the manufacturing tolerances can be relaxed, taking into account, that not the whole FOV must achieve full sharpness, as outer portions of the FOV can be pixel-binned.

In some embodiments, the generation of a panoramic image can further be enhanced by making use of the extremely precise rotation of the support unit 3. The rotation speed and the frame rate can be chosen so as to sample frames having sub-pixel overlap. In this way, a super-resolution can be achieved exceeding the resolution of the sensor.

Figure 11:
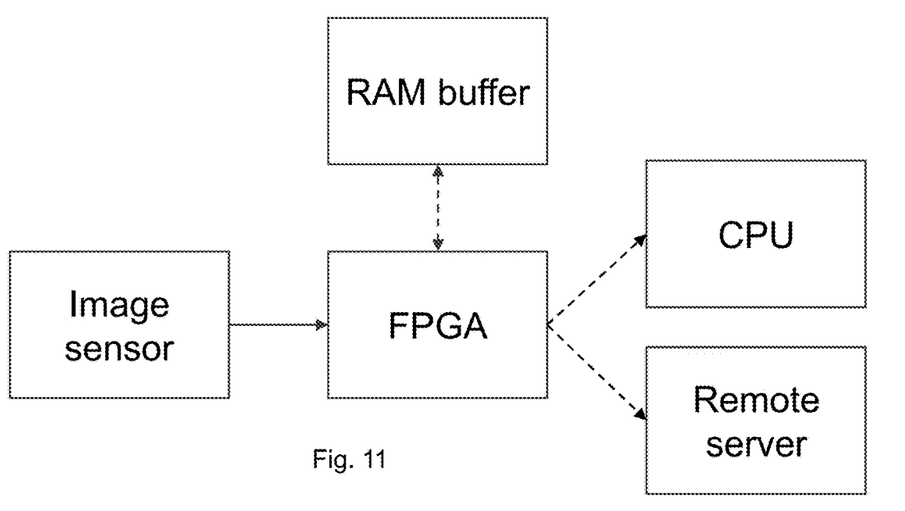
FIG. 11 shows a chart defining an exemplary computer infrastructure used in the measuring system.

FIG. 11 shows an exemplary chart of the dataflow during the panoramic image generation. The image sensor may send raw image data to an FPGA, e.g. with a speed of 1.8 Gbit/s. The FPGA may be located in close neighborhood to the sensor, i.e. in the directing unit 6. In some embodiments, the FPGA can pre-process the raw data, e.g. demosaicking, filtering, resizing, etc. In case a high-dynamic range (HDR) burst is captured with the sensor, the computer may deploy (and hence comprise) a RAM buffer. For processing or post-processing, the image data, which are possibly pre-processed, may be sent to a central processing unit (CPU) 14, which may be arranged in the support unit 3, and/or a remote server ("cloud"), e.g. with speeds of between around 200-500 Mbit/s. The CPU is configured for stitching the frames or stripes, and may in some embodiments be configured for overtaking optional jobs such as color corrections, noise reductions, tone-mapping, etc.

As mentioned before, the computer as defined herein can be a single device or have different components. The components may not necessarily be arranged inside the measuring instrument. Therefore, the total station from the illustrated examples is indeed a measuring instrument in that respective particular embodiment. However, as some functions may be implemented by external parts of the computer (e.g. arranged in a smart phone, tablet, controller, or a remote server etc.) in other embodiments, the generic term "measuring system" may be implemented. Thus, the shown exemplary total stations are also measuring systems regardless of where the computer components are located. More specifically of course, they are measuring instruments or measuring devices.

In some embodiments, when capturing the panoramic image, the sensor may be triggered by the computer at equidistant angles (regarding the rotation around the axis A), using the encoder as "master" and the camera as "slave". However, frames capturing the scene with equal distances are not necessary and as long as the angles for each frame are known, the panorama can be stitched correctly.

In certain embodiments, the processing of at least some of the sampled frames is not only based on the readings of the first encoder (rotation around the azimuth axis), but also on the readings of the second encoder (rotation around the elevation axis). For example, if the measuring system is not setup exactly straight, the motion of the support unit and the directing unit could be controlled so as to still generate a perfectly horizontal panoramic image.

There are several ways for making application-specific use of the panoramic images. One purpose is a colorization of a point cloud measured before or afterwards with the measuring system from the same location from which the panoramic image is captured.

Another use case would be using the panoramic image as an orientation help. If the measuring system has a display unit, e.g. built into a total station or on a smart phone connected to a measuring instrument, the panoramic image can be displayed on a graphical user interface (GUI) or as the GUI. In this way, the current surrounding is immediately at hand. Specifically, the panoramic image can be augmented with an indicator representing the current field of view of the camera or the current pointing direction of the camera. E.g. within the displayed panoramic image, a frame or a cross-hair is overlaid where the camera and/or the distance meter, is currently aiming at. As well, instead of a frame or some other graphics, the indicator can also be a live image of the camera using a section, in particular the full size of the image sensor. In other embodiments of the measuring system comprising also an on-axis camera or another off-axis camera, the panoramic image could also be augmented with the FOV and/or pointing direction of such additional camera. The terms on- and off-axis refer to the beam axis T. If the panoramic image is augmented with a live image, the GUI could be designed such that the live image is stationary in the center and the panoramic image extends left and right from the live image, and when the support unit is turning, the panoramic image could rotate accordingly so as to match the changing live image.

Another purpose of capturing the panoramic images is documentation. It is often imperative to store a photo of the measuring scene in order to be able to reproduce the situation at a later point in time. For example, in case the measuring data comprise an irregularity, it is very helpful to understand why that happened when a panoramic image or even a full-dome image is at hand.

The panoramic images may also be used to run a target recognition algorithm with the computer. Especially in a case where strong reflections will be considered to come from a target (measuring systems with flash unit will be discussed further below), an analysis of the panoramic image can indicate whether it really comes from a reflective target, or for example from something reflective that is not a target (e.g. reflective vest, mirror, etc.).

The processing of at least some of the sampled frames may be based on an averaging algorithm that uses the overlapping consecutive frames. The stitching of the pieces works particularly with the help of the angle information from the azimuthal angle encoder but may also, additionally or alternatively, rely on feature detection and an according matching of the stripes based on the detected features (shapes, structures, objects, colors, brightness, etc.).

In order to improve the dynamic range of the panoramic image, the frames might be sampled with an alternating exposure time in patterns like ABAB . . . , ABCABC . . . , ABCDABCD . . . , ABACABAC . . . , ABCBABCB . . . , ABCBDBABCBDB . . . etc. This scheme can be varied in order to get the best results after the overlapping parts of the frames are averaged.

In some embodiments, the computer may provide a moving object detection functionality. For that, the overlapping parts of the overlapping consecutive frames are compared to see if anything changed in them while the support unit 3 was turning around the azimuth axis A. If abnormalities are detected, e.g. a person or a car "entering" the FOV of that particular scene section, the stripe containing said abnormal features is discarded from processing the at least some of the sampled frames to form the panoramic image. Even if the moving obstacle or object is present in several stripes, a feature detection algorithm applied to the frames and run by the computer can identify which frames are affected to sort them out. Abnormal overlapping parts may be defined as overlapping parts of the overlapping consecutive frames that contain image information that differs from the image information of the majority of overlapping parts of the overlapping consecutive frames. Additionally or alternatively, abnormal overlapping parts may be defined as overlapping parts of the overlapping consecutive frames that contain image information that differs by a predefined threshold amount or percentage from the image information of an average image information of all overlapping parts of the overlapping consecutive frames.

In particular, the frames are sampled in full resolution, i.e. the files are stored as raw image files. According to FIG. 11, the image sensor can send these large files to the FPGA. The raw images can then undergo digital demosaicing before the frames are stitched to obtain the panoramic image. Alternatively or additionally, the frames (whether they are raw images or not) can undergo pixel binning, or the sensor itself can right away perform the pixel binning during readout. With pixel binning, adjacent pixels or the charge from adjacent pixels on the image sensor are combined. This results in a reduction of resolution, but it reduces noise as well and is slimming down processing efforts.

The camera particularly comprises a light sensor configured for detecting the light conditions in order to determine a required exposure time of the light sensor. The exposure time of the sensor and also the rotatory speed of the support unit 3 can be adapted in dependence of the light sensor readout at a corresponding rotatory position of the support unit 3. That is, changing light conditions (while the support unit 3 is turning) can be faced with changing exposure times of the frames. In low light conditions, this could mean that also the rotatory speed of the support unit 3 needs to be slowed down in order to avoid blur.

Figure 12:
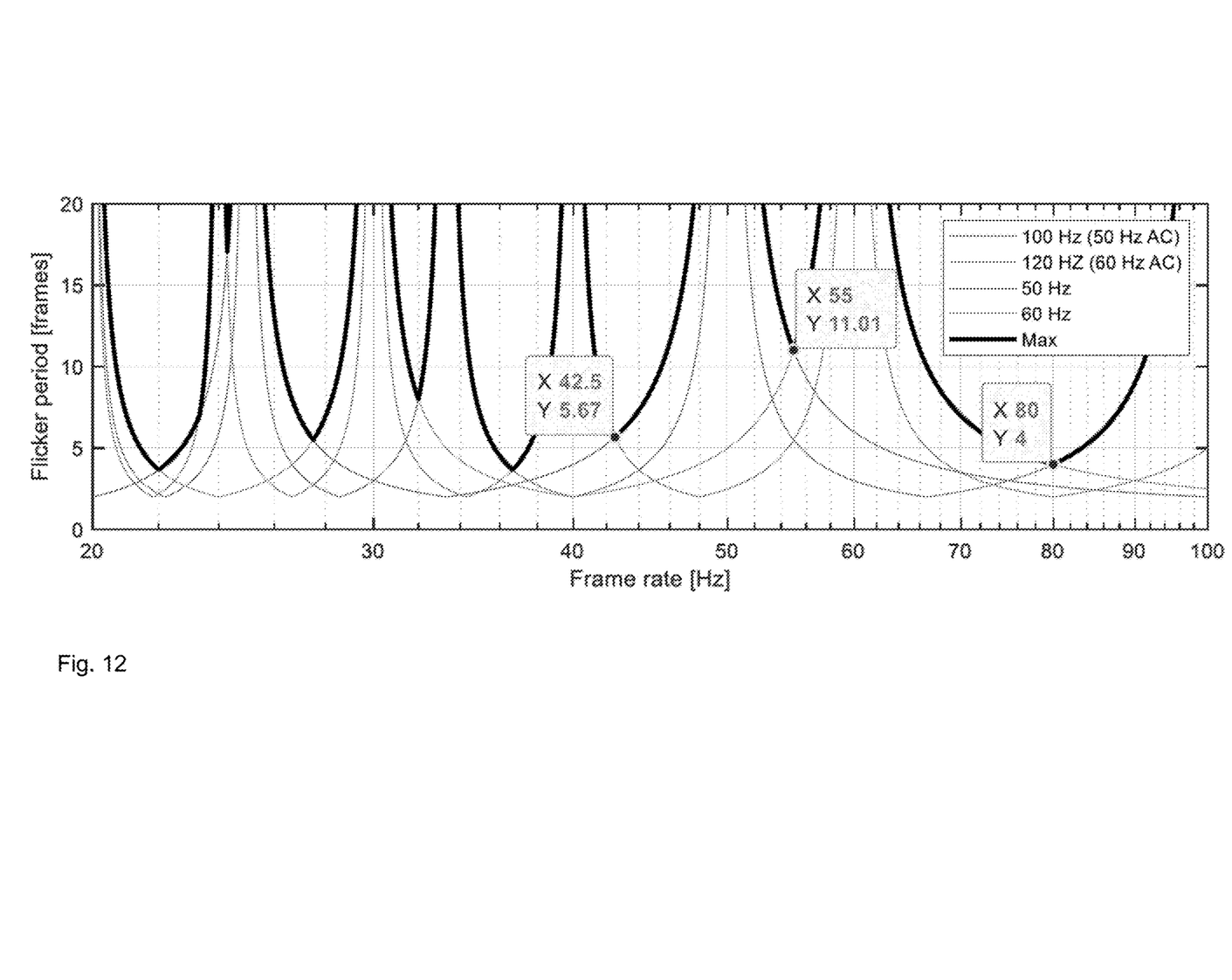
FIG. 12 shows a log chart plotting flicker periods for different frequencies from common flicker sources over the frame rate of the sensor.

With an optionally additional flicker sensor or e.g. with the above mentioned light sensor, power-line flicker can be detected which is caused by a lamp illuminating the scene. FIG. 12 gives an overview of common critical frequencies due to the nature of the European (50 Hz AC) and American (60 Hz AC) power supply system and common luminous devices such as LED-lights or computer screens (50 Hz and 60 Hz). The computer is then configured for adapting at least one of the frame rate of the sensor and the amount of overlapping consecutive frames based on the detected power-line flicker. For example, the marked local minima at 42.5 Hz, 55 Hz, and 80 Hz frame rate are good candidates to reduce the flicker period. Even though the 55 Hz candidate has a relatively high flicker period, if the amount of overlapping stripes is also determined to be 11, this provides optimal avoidance of a flicker effect in the panoramic image. A light sensor and/or a flicker sensor could be directed or unidirectional.

Further embodiments include the measuring system to record a second panoramic image covering the same part of the scene as a first panoramic image. This second run with the equal generation of a panoramic image allows for a detection of moving obstacles that were possibly captured with the first panoramic image. The computer is configured for analyzing object contours in the panoramic images, or in the single frames, and, in case a moving obstacle is detected in at least one of the first and second panoramic images, for generating a third panoramic image that is at least in part freed from the detected moving obstacle. This can be achieved by discarding the part of the respective panoramic image or the respectively affected frame from the processing. The generation of the third panoramic image may however also be based on retouching of the detected obstacle. The detection of a moving obstacle by comparing the first and second panoramic images could also be used by the computer to output an alert so that the user of the measuring system becomes aware of presence of an obstacle, in particular also aware of the location of the obstacle. The user can then attempt to clear the scene and generate another panoramic image.

A further panoramic image can be captured which is covering at least a part of what the preceding panoramic images was covering so that they can be stitched, wherein the further panoramic image is captured under a rotatory position of the directing unit 6 around the elevation axis E that is different from the rotatory position of the directing unit under which the first panoramic image was captured with. Proceeding in this way, as many panoramic images could be generated as are necessary to capture a full-dome image capturing the whole scene, or at least a big part of the whole scene.

Before generating a panoramic image, the measuring system could be programmed to obtain a preparatory panoramic image at first. The preparatory panoramic image can be captured with a relatively fast rotation around the azimuth axis A. Such a "pre-scan" could be allowed to be blurry from scanning quickly to reduce the pre-scan time. The preparatory panoramic image may be used as an indicator of where (i.e. at which rotatory position of the support unit 3 around the azimuth axis A) the camera should use which exposure time in the panoramic image to be captured afterwards. For example, the preparatory panoramic image could be captured with every frame of it being shot with the same exposure time. Afterwards the preparatory panoramic image could be analyzed with regard to brightness and/or with regard to the degree of blur. Since there is an exact correlation between each pixel and a rotatory position around the azimuth axis (and in particular also a rotatory position around the elevation axis) measured with the angle encoder, at the place where the preparatory panoramic image is underexposed, the camera can later use a higher exposure time, and at the place where the preparatory panoramic image is overexposed, the camera can later use a shorter exposure time.

Going back to the illustration of FIG. 3, a further embodiment includes sampling frames with not only one pixel stripe 15, but with at least a further stripe that samples the part of the scene before the stripe 15 does. This foregoing sampling can be used to predict a necessary exposure time at the respective rotatory position of the support unit 3.

Instead of having the sampling pixel stripe 15 in the center of the sensor as shown in FIG. 3, the measuring system can also use two such pixel stripes at the respective edges of the sensor to provide a stereo base line. Using these two image stripes, a 3D stereo reconstruction can take place. Another way to capture a panoramic stereo image is to use two cameras arranged distanced by a stereo base line, e.g. in the directing unit 6 or in the support unit 3. A further way to capture a panoramic stereo image is to capture two panoramic images in two different faces. In this case, the used camera is arranged in the directing unit 6. A change in face means that compared to a first face, under the second face the directing unit is aimed at the same part of the scene, but the azimuth angle or azimuthal position of the support unit 3 is shifted by 180°, wherein the directing unit 6 flipped up-side down. In other words, the support unit 3 is turned by 180° and the directing unit 6 is turned "back" by twice the angle that it spanned with the vertical. It is however required for achieving a stereo base line that the camera is off-axis with respect to the telescope (beam axis), i.e. the projection center of the camera should not be located on this pointing axis of the EDM beam, which is perpendicular to the elevation axis E and runs through the crossing point of azimuth axis A and elevation axis E. Above, the devices in FIG. 5 and FIG. 6 are introduced as two different embodiments (regarding the position of the camera). However, under the assumption that the devices in FIG. 5 and FIG. 6 are the same, these figures would show the two faces of the total station.

Figure 13:
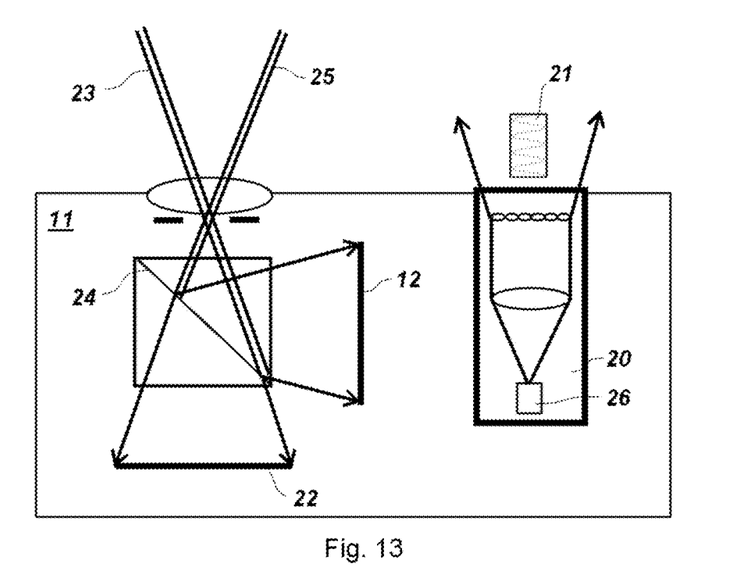
FIG. 13 shows an embodiment of the measuring system having a camera with two sensors and a flash unit.

In a further embodiment shown in FIG. 13, the measuring system comprises a infrared (IR) flash unit 20 configured for emitting an IR flash light 21 towards the scene and connected to the computer, the camera further comprising an IR sensor 22 configured for detecting a reflection 23 of the IR flash light 21, the camera 11 further comprising a chromatic beam splitter 24, the beam splitter configured to provide visual-spectrum (VIS) light 25 to the image sensor 12 and only IR light 23 to the IR sensor 22, the IR sensor 22 configured for capturing an IR image of at least part of what is captured with the image sensor 12. The light source 26 of the flash unit 20 may specifically emit light with a wavelength of 850 nm, and the IR flash light 21 may be modulated with a frequency of 100 MHz. The IR flash unit 20 is not necessarily arranged in the camera 11, but can also in other embodiments be arranged in/on other components of the measuring system. Of course, the location of the IR sensor and the image sensor may be exchanged wherein the configuration of the beam splitter is accordingly adapted (reflecting the IR spectrum and passing the VIS spectrum).

Any flash unit mentioned in the present disclosure may in particular be configured to send out flash light in the form of a vertically aligned fan, i.e. it is narrower in the horizontal direction to increase the power density and thus the signal-to-background ratio, and wider in the vertical direction to cover a large vertical field of view.

In another embodiment, the camera may comprise a Time-of-Flight (TOF) sensor, a flash unit configured for emitting IR flash light, and a beam splitter, the beam splitter configured to provide VIS light to the image sensor and IR light to the TOF sensor, wherein the TOF sensor is configured for capturing a TOF image of at least part of the scene that is captured with the image sensor, in particular based at least in part on reflections of the IR flash light. This embodiment is not shown in the figures but it may in one embodiment be imagined as the same schematic construction as FIG. 13 shows, only that the IR sensor is to be exchanged with the TOF sensor. This way, the camera can capture TOF images or TOF panoramic images at the same time as the image sensor 12 captures the (VIS) panoramic image.

In an embodiment of the measuring system, the camera comprises only a TOF sensor, which is capable of detecting VIS light and thus configured to generate a panoramic image. This panoramic image contains both visual data and range data.

In yet another embodiment, the measuring system can be configured for identifying a target which is located in the scene and emitting a modulated light pattern. The computer can realize this by detecting the modulated light pattern based on the overlapping frames captured with the image sensor 12 and based on relative times of capture of these overlapping frames. For example, when there are ten frames overlapping, there are ten depictions of the same stripe-shaped window of the scene. When these ten different, time-displaced depictions capture the actively blinking target, the modulated light pattern can be sampled by the image sensor and decoded by the computer.

Figure 14:
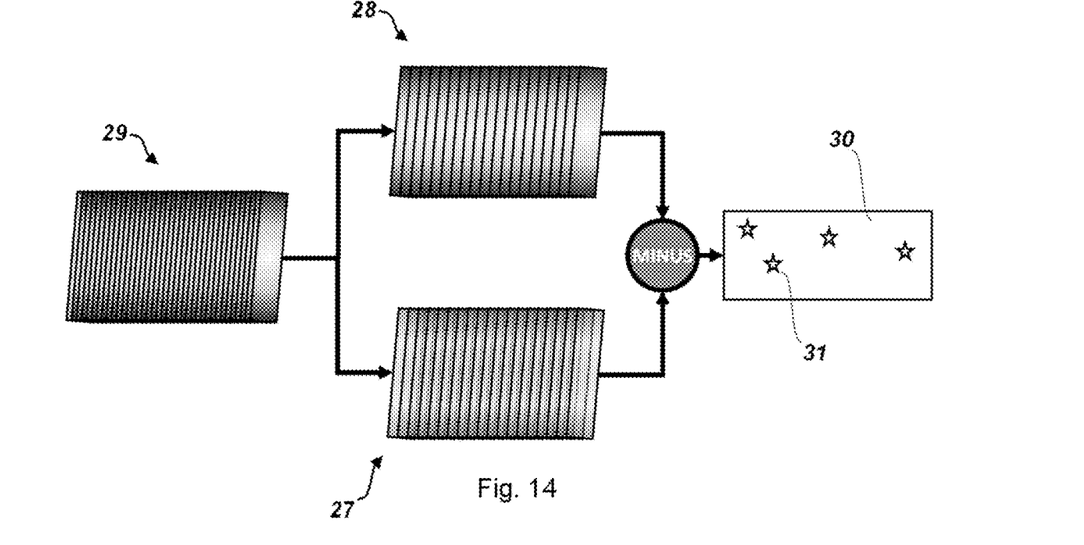
FIG. 14 shows an exemplary scheme used in the generation of a panoramic image by an embodiment of the measuring system.

According to FIG. 14, another embodiment relates to the simultaneous formation of two panoramic images by dedicating some 27 of the sampled frames 29 to the first panoramic image and some 28 of them 29 to another panoramic image, which is called herein "fourth panoramic image" for the sake of clarity. In a simple embodiment of this aspect, every second frame is used for the first, and every respective other frame is used for the fourth panoramic image, i.e. according to the scheme ABABAB . . . as shown in FIG. 14. One of the two panoramic images, in this case the fourth panoramic image, is generated based on frames 28 which capture the scene illuminated by a flash light, and the respective other panoramic image, the first panoramic image, is generated based on frames 27 which capture the scene non-illuminated by the flash light. Thus, the measuring system according to this embodiment further comprises a flash unit configured for emitting a flash light towards the scene, the computer is connected to the flash unit, and the camera is configured for detecting a reflection of the flash light. In this example, the image sensor is a VIS sensor and the flash unit provides VIS flash light.

For example, there could be other schemes, such as "AABABAABABAABAB . . . ", "AABAABAAB . . . ", or "AABBAABBAABB . . . ", wherein either A or B corresponds to the flashed image and the respective other of A and B corresponds to the non-flashed image. Thus, this embodiment corresponds to the notion that there is a sequence of sampled frames wherein only a selection of the sampled frames is illuminated by the flash light emitted by the flash unit. The AB-scheme could also be non-regular, i.e. randomized. The sequence of flashed frames and non-flashed frames is distinguishable by the computer, or in other words, the computer is configured to coordinate the flash rate and the sampling of the frames. The moments of sampling the frames is recorded (e.g. with time stamps) as well as the moments of flashing. The flash light emitted by the flash unit in this embodiment could be VIS light or IR light (in case of IR light, the camera is configured to detect IR light).

The flashed frames and the non-flashed frames could be sampled with the same sensor or with two separate sensors. An arrangement with two separate sensors could be similar to the configuration shown in FIG. 13.

Generalized, the aforementioned embodiment may therefore be so defined that, for n=3 (n refers to the amount of overlapping frames), the computer is configured for processing every second 27 of the sampled frames to form the first panoramic image, and for processing every respective other second 28 of the sampled frames to form the fourth panoramic image. However, for n>3, which could be according to a separate or the same embodiment, the computer is configured for processing at least every m-th of the sampled frames to form the first panoramic image, wherein m=(n−1), and for processing at least every r-th of the sampled frames to form a fourth panoramic image, wherein r=(n−1) and wherein the at least every r-th of the sampled frames are other than the at least every m-th of the sampled frames. As there can also be irregular schemes, the m-value and the r-value may be understood as average values, so they can but do not necessarily need to be a whole number. The computer is thus configured for controlling the flash to emit the flash light with a flash rate that is adapted so that every of the sampled frames that are processed to form the fourth panoramic image captures reflections of the flash light.

The fourth panoramic image, e.g. made from the frames 28, is depicting the captured scene illuminated by the flash unit. Reflective targets therefore appear in the fourth panoramic image as bright spots. After the computer is generating a difference image (indicated by the step "MINUS" in FIG. 14) from the first panoramic image (made from the frames 27) and fourth panoramic image to generate a target location panoramic image 30, said target location panoramic image will only comprise these bright spots 31 that are an indicator for the target locations in the scene. As every pixel of any panoramic image created by the measuring system has a correlation with the rotatory positions of the support unit and the directing unit, these positions 31 can later be aimed at with the transmission beam. For example, if the embodiment as presented with FIG. 14 is combined with the embodiment as presented with FIG. 13, by means of a TOF sensor, also the distance to the target can be determined.

Because of some special surfaces in the scene (e.g. reflective vests, mirrors, or similarly glossy surfaces), there could be bright spots 31 falsely suggesting there to be a target. Having the target location panoramic image at hand, a target recognition algorithm could then determine whether there are really targets or not by analyzing the first panoramic image (or any other panoramic image taken from the same scene) at the locations corresponding to the coordinates marked by the bright spots 31 in the target location panoramic image. In particular, the target recognition algorithm could further be configured to identify the type of target (if it is a target). Such a target recognition algorithm could also be used to actively search a specific target (type) within the panoramic image and then output the location, in particular expressed in measuring system coordinates, i.e. elevation angle, azimuth angle (and if captured with TOF sensor: also distance).

If the first and fourth panoramic images have been acquired with different exposure times, the difference (in particular: brightness) may need to be compensated by scaling the values of at least one of the panoramas so that they match.

In case the flash light is IR flash light and in case only one image sensor is used for the principle shown in FIG. 14, the image sensor may comprise either (a) a filter that is switchable between VIS and IR, (b) a divided filter, or (c) a plurality of pixels sensitive for the VIS and a plurality of pixels sensitive for the IR spectrum. With regards to (a), such a filter can block one or the other of VIS and IR in a respective mode. A switchable filter is for example a flat holder of an IR-blocker and a VIS-blocker that can be moved, in particular turned, in order to position one or the other into the optical path. Regarding (b), such a divided filter would be arranged close to the image sensor and divide the sensor in a VIS region and a IR region. In this case, a stripe in the VIS region and another stripe in the IR region would sample the respective frames. A filter only blocking a part of the image sensor from VIS light and allowing IR light to pass is also to be understood as "divided filter". With regards to (c) these differently dedicated pixels could e.g. be mixed like a checkerboard, or by alternating columns or rows of pixels dedicated to the respective wavelengths.

As a specification of the arrangement of FIG. 13, the extra sensor (IR sensor) could be used to arrive at a similar procedure as shown with the embodiment as presented with FIG. 14 (except for the difference image): the IR sensor 22 could be configured to sample IR frames to generate a IR panoramic image in a manner similar or equal to the sampling by the image sensor 12. The frames from the two sensors could be sampled at same times or time-displaced, also the sample rate does not have to be the same. The IR panoramic image would then provide target locations which the first panoramic image could be augmented with.

Instead of having a VIS sensor/IR sensor arrangement in an arrangement according to FIG. 13, a further embodiment of the measuring system could have a IR sensor with an optical axis separated from that of the VIS sensor, e.g. within one camera body or provided by a second camera. The IR sensor would then have its own lens(es), i.e. focusing optics.

Each of the many embodiments presented above can be combined with each other in any combination. Although the invention is illustrated above, partly with reference to some preferred embodiments, it must be understood that numerous modifications and combinations of different features of the embodiments can be made. All of these modifications lie within the scope of the appended claims.

The invention claimed is:
1. A measuring system for acquiring three-dimensional measuring points, comprising
a base unit,
a support unit mounted on the base unit and rotatable relative to the base unit around an azimuth axis,
an emitting unit configured for providing a transmission beam,
a receiving unit configured for detecting a reception beam,
a directing unit mounted in the support unit, rotatable relative to the support unit around an elevation axis, and configured for
directing the transmission beam from the emitting unit towards a scene,
directing the reception beam from the scene to the receiving unit,
a first actuator configured for rotating the support unit relative to the base unit around the azimuth axis,
a second actuator configured for rotating the directing unit relative to the support unit around the elevation axis,
a first angle encoder configured for measuring a rotatory position of the support unit,
a second angle encoder configured for measuring a rotatory position of the directing unit,
a camera comprising an image sensor, wherein the camera is configured for capturing an image of at least part of the scene,
a computer connected to the first actuator, the second actuator, the first angle encoder, the second angle encoder, and the camera, wherein the computer is configured for
controlling a rotatory speed of the support unit via the first actuator, and
controlling a rotatory speed of the directing unit via the second actuator,
the computer is configured for generating a first panoramic image with the camera, comprising:
controlling the image sensor to sample frames with a frame rate,
controlling the first actuator to rotate the support unit with a rotatory speed that is adapted to the frame rate of the image sensor in such a way that n consecutive frames are overlapping, wherein n≥3, and wherein the n consecutive overlapping frames comprise an overlapping region common to all of the n consecutive overlapping frames and
processing at least some of the sampled frames to form the first panoramic image by accumulation, the accumulation comprising mapping the overlapping sample frames onto the first panoramic image by taking at least the first angle encoder reading into account,
wherein controlling the image sensor to sample frames comprises controlling the image sensor to sample frames with an image aspect ratio of between 1:5 and 1:40,
wherein a long extent of the frames are aligned parallel to the azimuth axis and a shorter extent are aligned parallel to the elevation axis.

2. The measuring system according to claim 1, comprising a display unit configured for
displaying the first panoramic image on a graphical user interface (GUI) and
augmenting the first panoramic image on the GUI with an indicator, the indicator in particular representing the current field of view of the camera or the current pointing direction of the camera.

3. The measuring system according to claim 1, wherein, for generating the first panoramic image with the camera, the computer is further configured for controlling the image sensor to sample the frames with an alternating exposure time.

4. The measuring system according to claim 1, wherein processing the sampled frames comprises stitching and averaging the overlapping consecutive frames.

5. The measuring system according to claim 1, wherein the computer is configured for
comparing the overlapping parts of the overlapping consecutive frames with each other and
discarding abnormal overlapping parts when processing the sampled frames to form the first panoramic image.

6. The measuring system according to claim 1, comprising a flicker sensor configured for detecting power-line flicker caused by a lamp illuminating the scene, wherein the computer is configured for adapting, based on the detected power-line flicker, at least one of
the frame rate and
the amount of overlapping consecutive frames n.

7. The measuring system according to claim 1, wherein the computer is configured for
generating a second panoramic image covering the same part of the scene as the first panoramic image, detecting moving obstacles in the first and second panoramic images based on an analysis of object contours, and, in case a moving obstacle is detected in at least one of the first and second panoramic images, generating an obstacle-freed panoramic image by processing the first and second panoramic image such that the obstacle-freed panoramic image is at least in part freed from the detected moving obstacle.

8. The measuring system according to claim 1, further comprising a visual-spectrum (VIS) flash unit configured for emitting VIS flash light towards the scene and connected to the computer, or an infrared (IR) flash unit configured for emitting IR flash light towards the scene and connected to the computer.

9. The measuring system according to claim 1, wherein the camera further comprises a Time-Of-Flight (TOF) sensor or the image sensor is embodied as a Time-Of-Flight (TOF) sensor, said TOF sensor configured for capturing a TOF image, said TOF image comprising range data and image data, wherein the image data are either generated by the detection of visual-spectrum (VIS) light or IR light.

10. The measuring system according to claim 1, wherein the computer is configured for adapting:

an exposure time of the sensor and the rotatory speed of the support unit based on an exposure time as detected necessary by the camera due to respective light conditions detected by the camera at the corresponding rotatory position of the support unit.

11. The measuring system according to claim 1, wherein, for identifying a target which is located in the scene and emitting a modulated light pattern, the computer is configured for detecting the modulated light pattern based on the overlapping frames and relative times of capture of these overlapping frames.

12. The measuring system according to claim 1, wherein the image sensor comprises a central crop region, and wherein the sample frames corresponding to the central crop region of the image sensor.

13. The measuring system according to claim 1, wherein each pixel of the first panorama image is based on an averaging and blending of n-frames.

14. The measuring system according to claim 1, wherein the mapping the overlapping sample frames onto the first panoramic image further taking the camera's intrinsic and extrinsic calibration into account, and wherein the accumulation further comprising normalized by dividing by the number of samples accumulated in each pixel of the first panoramic image.

15. The measuring system according to claim 1, wherein processing at least some of the sampled frames to form the first panoramic image is embodied as for n=3, processing every second of the sampled frames to form the first panoramic image, or for n>3, processing at least every m-th of the sampled frames to form the first panoramic image, wherein m=(n−1).

16. The measuring system according to claim 15, further comprising a flash unit configured for emitting a flash light towards the scene, the computer connected to the flash unit, the camera configured for detecting a reflection of the flash light, wherein, for generating a target location panoramic image with the camera, the computer is configured for:

for n=3, processing every respective other second of the sampled frames to form a fourth panoramic image, or for n>3, processing at least every r-th of the sampled frames to form a fourth panoramic image, wherein r=(n−1) and wherein the at least every r-th of the sampled frames are other than the at least every m-th of the sampled frames, controlling the flash to emit the flash light with a flash rate that is adapted so that every of the sampled frames that are processed to form the fourth panoramic image captures reflections of the flash light, generating a difference image from the first and fourth panoramic image, wherein the target location panoramic image is based on the difference image.

17. The measuring system according to claim 16, wherein the flash light is IR flash light, wherein the image sensor comprises either a filter that is switchable between VIS and IR, a divided filter, or a plurality of pixels sensitive for the VIS and a plurality of pixels sensitive for the IR spectrum.

18. A measuring system for acquiring three-dimensional measuring points, comprising a base unit, a support unit mounted on the base unit and rotatable relative to the base unit around an azimuth axis, an emitting unit configured for providing a transmission beam, a receiving unit configured for detecting a reception beam, a directing unit mounted in the support unit, rotatable relative to the support unit around an elevation axis, and configured for directing the transmission beam from the emitting unit towards a scene, directing the reception beam from the scene to the receiving unit, a first actuator configured for rotating the support unit relative to the base unit around the azimuth axis, a second actuator configured for rotating the directing unit relative to the support unit around the elevation axis, a first angle encoder configured for measuring a rotatory position of the support unit, a second angle encoder configured for measuring a rotatory position of the directing unit, a camera comprising an image sensor, wherein the camera is configured for capturing an image of at least part of the scene, a computer connected to the first actuator, the second actuator, the first angle encoder, the second angle encoder, and the camera, wherein the computer is configured for controlling a rotatory speed of the support unit via the first actuator, and controlling a rotatory speed of the directing unit via the second actuator, the computer is configured for generating a first panoramic image with the camera, comprising:

controlling the image sensor to sample frames with a frame rate, controlling the first actuator to rotate the support unit with a rotatory speed that is adapted to the frame rate of the image sensor in such a way that n consecutive frames are overlapping, wherein n≥3, and wherein the n consecutive overlapping frames comprise an overlapping region common to all of the n consecutive overlapping frames and processing at least some of the sampled frames to form the first panoramic image, wherein controlling the image sensor to sample frames comprises controlling the image sensor to sample frames with an image aspect ratio of between 1:5 and 1:40, wherein a long extent of the frames are aligned parallel to the azimuth axis and a shorter extent are aligned parallel to the elevation axis, and wherein the image sensor comprises a central crop region, and wherein the sample frames corresponding to the central crop region of the image sensor.

19. The measuring system according to claim 18, wherein each pixel of the first panorama image is based on an averaging and blending of n-frames.

* * * * *

UNITED STATES PATENT AND TRADEMARK OFFICE
CERTIFICATE OF CORRECTION

| | | |
|---|---|---|
| PATENT NO. | : 12,356,077 B2 | Page 1 of 1 |
| APPLICATION NO. | : 17/706349 | |
| DATED | : July 8, 2025 | |
| INVENTOR(S) | : Johan Stigwall et al. | |

It is certified that error appears in the above-identified patent and that said Letters Patent is hereby corrected as shown below:

On the Title Page

Insert item (30):
--Foreign Application Priority Data:
Mar. 30, 2021 (EP) .................. 21166123--

Signed and Sealed this
Sixteenth Day of September, 2025

Coke Morgan Stewart
*Acting Director of the United States Patent and Trademark Office*